United States Patent [19]
Waddington et al.

[11] Patent Number: 5,382,035
[45] Date of Patent: Jan. 17, 1995

[54] VEHICLE RUNNING BOARD ASSEMBLY

[75] Inventors: Donald R. Waddington, Huntsville; Robert J. Boulard, HammerBay, both of Canada

[73] Assignee: Algonquin Industries International, Inc., Huntsville, Canada

[21] Appl. No.: 49,184

[22] Filed: Apr. 19, 1993

[51] Int. Cl.⁶ .................................................. B80R 3/00
[52] U.S. Cl. .................................................... 280/169
[58] Field of Search .................. 280/163, 164.1, 164.2, 280/169; 296/75

[56] References Cited

U.S. PATENT DOCUMENTS

| | | | |
|---|---|---|---|
| 324,668 | 3/1992 | Anderson | D12/203 |
| 2,084,025 | 6/1937 | Getz | 280/169 |
| 2,122,240 | 6/1938 | Smith | 280/169 |
| 4,203,611 | 5/1990 | Makela | 280/163 |
| 4,257,620 | 3/1981 | Okland | 280/163 |
| 4,451,063 | 5/1984 | Snyder | 280/163 |
| 4,557,494 | 12/1985 | Elwell | 280/164.1 |
| 4,934,721 | 6/1990 | Flores | 280/169 |
| 5,193,829 | 3/1993 | Halloway et al. | 280/163 |

*Primary Examiner*—Richard M. Camby
*Attorney, Agent, or Firm*—Harness, Dickey & Pierce

[57] ABSTRACT

A multi-part running board assembly attachable to a vehicle, including a longitudinally extending deck, a decorative overlay which covers the deck, and a pair of end caps which partially overlap the ends of the deck and overlay is provided. The deck includes recessed areas for receiving tab members which extend downwardly from the bottom surface of the overlay to secure the overlay to the deck. The end caps typically include vertically projecting portions which preclude debris from being projected upon the outer surface of the overlay by the vehicle's tires.

20 Claims, 2 Drawing Sheets

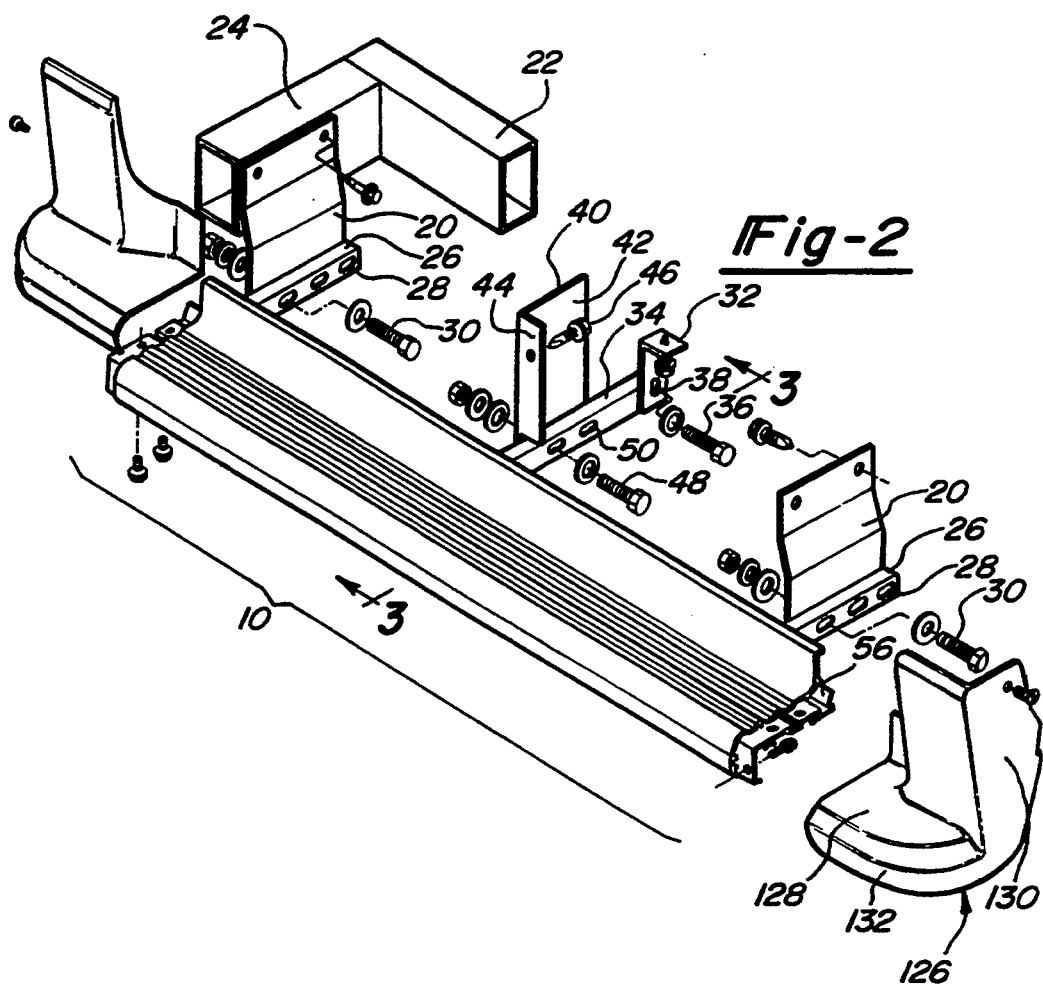
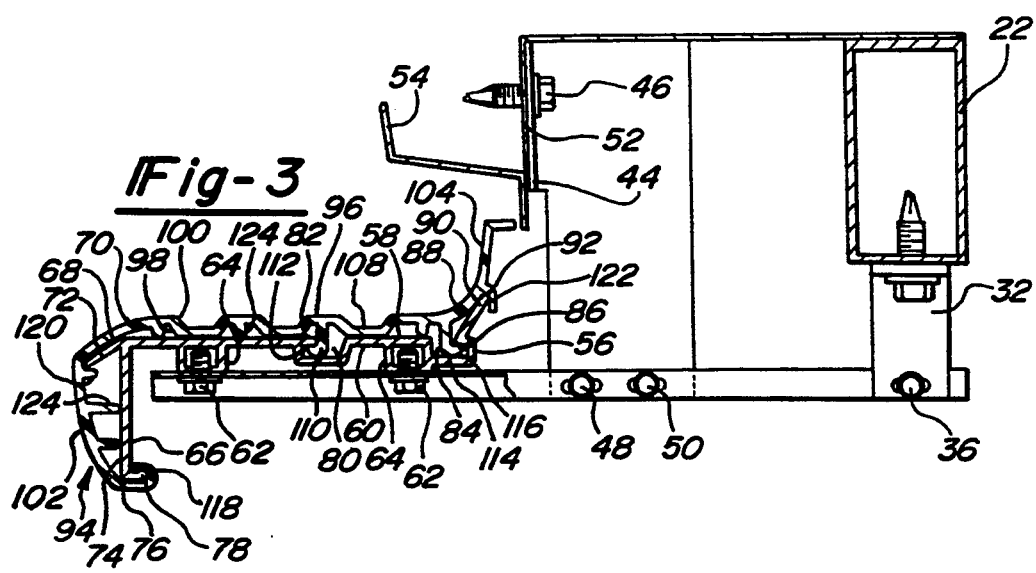

1

VEHICLE RUNNING BOARD ASSEMBLY

BACKGROUND OF THE INVENTION

1. Field of the Invention

This invention relates to vehicle running boards, and more particularly, to a vehicle running board assembly which is adaptable for attachment to a number of different vehicles.

2. Brief Description of the Related Art

Heretofore, various types of running board structures have been used on trucks and other vehicles. One such running board structure includes a large metallic plate formed as a single piece. While this type of running board structure is generally relatively inexpensive to manufacture it is difficult to form to size requirements, and does not allow for aesthetic changes. Another type of running board now commonly in use requires one or more transverse cross members to be secured beneath the running board to reinforce the running board against bending when subjected to weight loads. These transverse members are generally bolted to the underside of the running board by bolts which extend through the running board. The head of the bolt is thereby exposed on the upper sudace of the running board which seriously detracts from the aesthetics of the running board.

Ideally a vehicle running board assembly should be easy to assemble, durable enough to withstand heavy weight loads and be aesthetically appealing. The present invention therefore provides a vehicle running board assembly which includes a durable elongated deck which is covered by a decorative overlay. The elongated deck is supportably attached to the vehicle by a plurality of mounting brackets and horizontally oriented supports. The decorative overlay is provided with means for being attached to the deck and with a plurality of grooves which improve the traction of the running board assembly upon entry into and exit from the vehicle. The running board assembly is also provided with decorative end caps disposed at each end of the running board assembly which partially overlap a portion of the elongated deck and decorative overlay to further enhance the decorative appearance of the running board assembly. The end caps serve the additional function of limiting and preferably precluding dirt, mud and other undesirable elements from being projected upon the running board and vehicle side body panels by the vehicle's tires.

It is therefore a primary object of the present invention to provide a vehicle running board assembly which is durable and capable of handling substantial weight loads.

Another object of the present invention is to provide the running board assembly having end caps which preclude dirt, mud and other undesirable elements from being projected upon the running board by the vehicle's tires.

Yet another object of the present invention is to provide a vehicle running board assembly which is easy to install.

Still another object of the present invention is to provide a running board assembly which is aesthetically appealing.

Other advantages and features will become apparent from the following specification taken in connection with the accompanying drawings.

SUMMARY OF THE INVENTION

To achieve the foregoing objects, the present invention provides a vehicle running board assembly which generally comprises a plurality of mounting brackets attachable to the vehicle's frame, a longitudinally extending running board deck, a decorative overlay and end caps disposed along each end of the running board assembly. Attached to each mounting bracket is a horizontally extending support adapted to receive the running board deck. The decorative overlay includes a plurality of spaced apart grooves disposed on a top surface which provide additional traction and various aesthetic patterns to the running board assembly. The bottom surface of the running board deck includes means for being secured to the running board deck. The means for being secured by the running board deck generally include a plurality of longitudinally extending tabs which are received by recesses contained on the deck. The recesses contained on the deck are provided with flanges which partially extend over the recesses to provide a surface against which the hook shaped ends of the tabs are held in an abutting relationship.

The end caps are positioned at each end of the running board and partially overlap both the deck and overlay. According to a preferred embodiment the end caps include vertically extending portions to preclude debris from being projected upon the running board by the vehicle's tires.

BRIEF DESCRIPTION OF THE DRAWINGS

Additional objects and advantages of the present invention will become apparent from reading the detailed description of the preferred embodiments which make reference to the following set of drawings in which:

FIG. 2 is an exploded perspective view of the running board assembly of the present invention; and FIG. 3 is a cross-sectional view taken along lines 3—3 of FIG. 2.

DESCRIPTION OF THE PREFERRED EMBODIMENT

Figure 1:
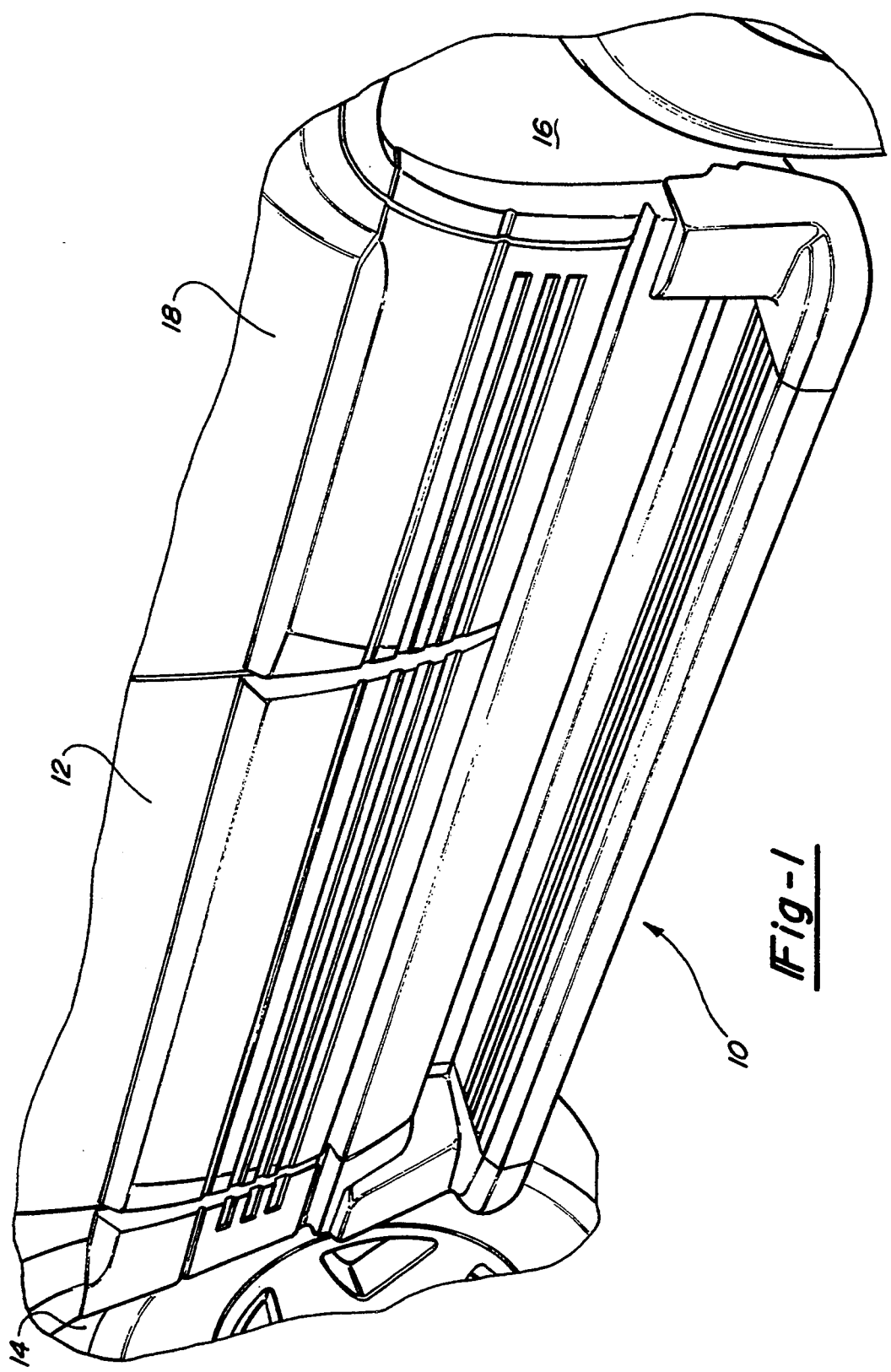
FIG. 1 is a perspective view of the running board assembly of the present invention as attached to a vehicle.

Referring to FIG. 1 a running board assembly 10 in accordance with the teachings of the present invention is shown attached to a vehicle 12. The running board assembly 10 is adaptable to be attached to a variety of different vehicles including trucks and vans, among others. The running board assembly 10 is designed to extend longitudinally from a first wheel well 14 to a second wheel well 16 and to be positioned below the doors 18 on each side of the vehicle.

Referring to FIGS. 2 and 3 the components which make up the running board assembly 10 according to the present invention will now be described in greater detail. The running board assembly 10 is provided with mounting means for supporting the running board assembly with a pair of spaced apart mounting brackets 20 located at opposing ends of the assembly which are attachable to the perpendicularly disposed portions 24 of the vehicle's frame 22. The mounting brackets 20 include a horizontally oriented support member 26 which is typically attached via a nut and bolt assembly 30. The support members 26 are selectively adjustable along horizontally aligned slots 28 to accommodate for differences in vehicle sizes and designs. A centrally located mounting bracket 32 is also provided and is attached to the under side (not shown) of the frame 22 by suitable fastening means such as a nut and bolt assembly. The central mounting bracket 32 is attached to a horizontally extending support member 34 by a bolt 36 through slot 38. The slot 38 is also provided to allow for adjustment of the bracket to accommodate for differences in vehicle sizes and designs. A substantially L-shaped brace 40 is attached to the support member 34 by a nut and bolt assembly 48 along a first face 42 and to the vehicle's floor board 52 and rocker panel 54 along a second face 44 by a bolt 46 to assist in aligning the running board assembly 10. The support member 34 is likewise provided with horizontally aligned slots 50 to allow for adjustments of the brace 40 along the support member 34 to accommodate for differences in vehicle size dimensions. It should be understood by those skilled in the art that the supporting members could be made integral with the support members at the time of manufacture or bonded together mechanically, or by welding anytime thereafter prior to attaching the running board assembly to the vehicle.

The running board assembly 10 also includes an elongated running board deck 56 having a top surface 58 and a bottom surface 60 which is mounted on top of the support members 26 and 34, respectively. The bottom surface 60 of the deck is provided with a plurality of spaced apart downwardly extending sockets 64 which can be provided with threaded apertures for hosting the bolts 62 or may host nuts (not shown) which secure the bolts 62 in place. The deck 56 also includes a vertically extending section 66 and a horizontally extending section 70 which extends from a first edge 68 of the vertical section 66. Optionally, but preferably, an extending wall 72 is provided along at least a portion of the first edge 68 to assist in structurally supporting the decorative overlay 94.

The deck also includes various means for retaining the selectively attachable decorative overlay. Such means include a projecting edge 78 disposed at one end 74 of the deck along a second end 76 of the vertical section 66 which extends in the direction of the vehicle to provide a point of attachment for the overlay 94. The horizontal section 70 of the deck 56 includes a first recess 80 and a second recess 84 extending longitudinally along the length of the deck. Each recess 80 and 84, respectively, includes an overhanging flange 82 and 86 which provides an abutting surface to preclude the undesired separation of the overlay from the deck upon attachment. Located at the second end 88 of the deck 56 is a wall 90 extending substantially transversely and upwardly from the horizontal portion of the deck which provides yet another point of attachment along the edge 92 for retaining the overlay.

A longitudinally extending overlay 94 is provided and attached over the deck 56 to provide the running board assembly 10 with a decorative appearance. The overlay 94 includes a horizontally extending section 100 which substantially covers the horizontally disposed section 70 of the deck 56 located between the first edge 68 and the base of the transversely disposed wall 90. The overlay 94 also includes a vertically disposed downwardly extending section 102 which covers the wall 72 and the vertically disposed downwardly extending section 66 of the deck and a substantially vedically disposed upwardly extending portion 104 which covers the wall 90. Typically the upwardly extending portion 104 extends up to approximately the base of the rocker panel 54.

The overlay 94 also includes a top surface 96 and a bottom surface 98. The top surface 96 is provided with means for providing traction to the running board assembly which includes a plurality of longitudinally extending grooves 108 which assist in providing the overlay 94 with a gripping surface. The bottom surface 98 of the overlay 94 is provided with various means for securing the overlay 94 to the deck 56. Extending from the bottom surface 98 is a first longitudinally extending tab member 110 having a hook shaped end 112 projecting in the direction of the vertically extending section 66 of the deck. The hook shaped end is designed to lock under the flange 82 which partially extends over the first recess 80 in an abutting relationship. Likewise, a second longitudinally extending tab 114 located more proximate to the vertical upwardly extending overlay portion 104 extends from the bottom surface 98 and includes a hooked end 116 which projects in the direction of the vehicle's frame 22. The hooked portion 116 of the tab member 112 also locks under a flange 86 in an abutting relationship to resist separation of the overlay from the deck. The means for securing the overlay 94 to the deck 56 also includes an incurved end portion 118 which hosts the projecting edge 78 of the deck 56. Additionally, the bottom surface 98 of the overlay 94 is provided with a pair of projecting barriers 120 and 122 against which the first wall 72 and second wall 90, respectively, are positioned to further retain the overlay 94 in a contiguous relationship with the deck 56. For structural support the bottom surface 98 of the overlay 94 is provide with a plurality of studs 124 which preclude deformation of the overlay 94 due to heavy loads or excessive forces being exerted thereon.

Preferably the overlay 94 is made from a flexible material such as rubber or plastic which is somewhat tacky and may be extruded in various hardnesses. It will be understood by those skilled in the art that the overlay can be formed as a separate component which is thereafter attached to the deck or can be formed integrally upon the deck by extrusion molding. Once the overlay has been attached to the deck, the overlay can be treated with a commercially available conditioning product which provides additional tackiness and/or a glossy appearance to the overlay.

The end caps 126 typically include a horizontal portion 128, a vertically extending portion 130 and an arcuate somewhat vertically disposed face 132 located below the horizontal portion 128. Ideally, the end caps 126 are fastened to the running board assembly 110 such that the end caps at least partially overlap the overlay and deck. In this overlapping position the horizontal portion 128 of the end cap is disposed contiguously against the horizontal section 100 and the arcuate face 132 is disposed contiguously against the vertically extending portion 102 of the overlay 94. The vertically extending portions 130 are designed to assist in precluding dirt, mud and other debris from being projected upon the overlay by the vehicle's wheels when the vehicle is in motion. Preferably, the end caps are attached to the vehicle within the wheel wells and from underneath the deck such that the fasteners do not detract from the aesthetics of the running board assembly.

The invention has been described in an illustrative manner, and it is to be understood that the terminology which has been used is intended to describe the invention in a non-limited manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A vehicle running board assembly, comprising:
    a longitudinally extending overlay including a horizontally disposed section, a downwardly extending. section disposed alonq one edge of the horizontal section, and an upwardly extending section disposed along the opposite edqe of said horizontal section, said upwardly extending section including a barrier extending from the bottom surface thereof;
    an elongated deck having a vertically downwardly extending section, a horizontal section extending from a first edge of said vertical section, an upwardly extendinq wall disposed along another edge of said horizontal section, said wall being engaged by said barrier to assist in securing the overlay, and means for retaining said overlay;
    mounting means for supporting said deck, said mounting means including at least one support member extending transversely beneath the horizontal section of said deck;
    fastening means for fastening said deck to said at least one support member; and
    end caps having a horizontally disposed portion and a substantially vertically extending portion, whereby said end caps partially overlap said deck to conceal the ends of the deck.

2. The vehicle running board assembly according to claim 1 wherein said means for retaining said overlay comprise recess means having an overhanging flange.

3. The vehicle running board assembly according to claim 2, wherein said means for retaining said overlay further comprise first and second extending walls.

4. The vehicle running board assembly according to claim 3, wherein said overlay further comprises:
    means for providing traction to said running board assembly; and
    means for selectively attaching said overlay to said deck.

5. The vehicle running board assembly according to claim 4, wherein said means for providing traction include a plurality of spaced apart grooves extending longitudinally along the top surface of said overlay.

6. The vehicle running board assembly according to claim 4, wherein said means for selectively attaching said overlay to said deck includes tab means extending downwardly from the bottom surface of said overlay.

7. The vehicle running board assembly according to claim 6, wherein said tab means include a pair of spaced apart tab members, each of said tab members including hooked end portions.

8. The vehicle running board assembly according to claim 7, wherein said hooked end portions are disposed in opposite directions.

9. The vehicle running board assembly according to claim 6, wherein said means for selectively attaching said overlay to said deck further comprises:
    an incurred end portion disposed on said overlay which overlaps the projecting edge of the vertically extending portion of the deck.

10. The running board assembly according to claim 4, wherein said means for selectively attaching said overlay to said deck further includes first and second barriers extending from the bottom surface of said overlay, whereby said barriers engage said extending walls.

11. The running board assembly according to claim 2, wherein the overlay includes a plurality of longitudinally disposed studs extending from the bottom surface of said overlay which contact the deck, whereby the studs protect the overlay from deformation due to excessive forces exerted upon said overlay.

12. The vehicle running board assembly according to claim 1, wherein said mounting means include a plurality of substantially vertically extending brackets which are attachable along a first end to the vehicle's frame and at a second end to a support member, wherein said support members include means for adjusting said running board assembly along a horizontal plane.

13. The vehicle running board assembly according to claim 12, wherein said means for adjusting said running board assembly along a horizontal plane include slot means provided on said support members for adjusting the support members relative to the brackets prior to fastening the support members to said brackets.

14. A vehicle running board assembly attached to a vehicle frame, comprising:
    means for attaching said running board assembly to said frame, said means including extending support members;
    an elongated deck having a vertical downwardIV extending section including an inwardly extending edge, a horizontal section including a top surface and a bottom surface, and an upwardly extending wall disposed along an edge of said horizontal section opposite that of said downwardly extending section, said top surface having longitudinally disposed recess means, said recess means including a flange extending partially over said recess means, and said bottom surface including means for selectively attaching said deck to said support members;
    a decorative overlay having a top surface and a bottom surface including a horizontally disposed section, a downwardly extending section which is disposed over the downwardly extendinq section of said deck and an upwardly extending section which is disposed over and extends beyond the upwardly extending wall of said deck, said overlay including means for being selectively attached to said deck which includes a barrier extending from the bottom surface along said upwardly extending section to engage the upwardly extending wall of the deck; and
    end caps positioned along each end of said running board assembly.

15. The running board assembly according to claim 14, wherein said means for being selectively attached to said deck include tab means extending longitudinally from the bottom surface of said overlay, said tab means including a hooked shaped end, whereby said hooked shaped end extends into the recess means of the deck and locks under said flange.

16. The running board assembly according to claim 15, wherein said tab means include first and second spaced apart tab members.

17. The running board assembly according to claim 16, wherein the hook shaped ends of said tab members are disposed in opposite directions.

18. The running board assembly according to claim 15, wherein said means for being selectively attached to said deck includes an incurved end portion which partially overlaps the inwardly extending edge of said deck.

19. The running board assembly according to claim 14, wherein said decorative overlay further comprises, a plurality of spaced apart longitudinally extending grooves located along the top surface of said overlay.

20. The running board assembly according to claim 14, wherein said overlay includes a plurality of longitudinally disposed studs extending from the bottom surface of said overlay, whereby said studs provide the overlay with structural support.

* * * * *

UNITED STATES PATENT AND TRADEMARK OFFICE
CERTIFICATE OF CORRECTION

PATENT NO. : 5,382,035

DATED : Jan. 17, 1995

INVENTOR(S) : Donald R. Waddington, et al.

It is certified that error appears in the above-indentified patent and that said Letters Patent is hereby corrected as shown below:

Col. 1, Line 26, "Sudace" should be --surface--;

Col. 3 Line 66, "vedically" should be --vertically--;

Col. 4, Line 33, "provide" should be --provided--;

Col. 5, Line 9-10, Claim 1, "extending." should be --extending--;

Col. 5, Line 19, Claim 1, "extendinq" should be --extending--;

Col. 6, Line 28, Claim 14, "downwardlV" should be --downwardly--; and

Col. 6, Line 42, Claim 14, "extendinq" should be --extending--.

Signed and Sealed this

Sixteenth Day of May, 1995

Attest:

BRUCE LEHMAN

Attesting Officer

Commissioner of Patents and Trademarks